United States Patent
Cho et al.

(10) Patent No.: US 11,698,972 B2
(45) Date of Patent: Jul. 11, 2023

(54) METHOD TO SECURELY TRANSFER ROOT OF TRUST RESPONSIBILITIES ON A COMMON SHARED MOTHERBOARD

(71) Applicant: Dell Products L.P., Round Rock, TX (US)

(72) Inventors: Eugene David Cho, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 126 days.

(21) Appl. No.: 17/383,041

(22) Filed: Jul. 22, 2021

(65) Prior Publication Data
US 2023/0025053 A1 Jan. 26, 2023

(51) Int. Cl.
*G06F 21/57* (2013.01)
*H04L 9/08* (2006.01)
*G06F 21/72* (2013.01)
*G06F 9/4401* (2018.01)

(52) U.S. Cl.
CPC .......... *G06F 21/575* (2013.01); *G06F 9/4401* (2013.01); *G06F 21/72* (2013.01); *H04L 9/0816* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 10,796,002 B1 * | 10/2020 | Raskin | G06F 21/85 |
| 10,896,266 B1 * | 1/2021 | BeSerra | H04L 63/062 |
| 2009/0037749 A1 * | 2/2009 | Jeansonne | G06F 21/575 |
| | | | 713/194 |
| 2017/0048070 A1 * | 2/2017 | Gulati | H04L 9/0861 |
| 2018/0039795 A1 * | 2/2018 | Gulati | H04L 63/0823 |
| 2018/0097639 A1 * | 4/2018 | Gulati | G09C 1/00 |
| 2020/0082092 A1 * | 3/2020 | Areno | H04L 9/0866 |
| 2021/0111901 A1 * | 4/2021 | Ibrahim | G06F 21/72 |

FOREIGN PATENT DOCUMENTS

EP 3304944 B1 * 3/2020 ........... G01S 5/0221

* cited by examiner

*Primary Examiner* — Zahid Choudhury
(74) *Attorney, Agent, or Firm* — Chamberlain, Hrdlicka, White, Williams & Aughtry

(57) ABSTRACT

In general, embodiments of the invention relate to implementing a secure boot process in information handling systems that supports both an external root of trust (eRoT) and an internal root of trust (RoT). Further, embodiments of the invention relate to binding a management controller to a specific chassis and, in the case where the eRoT is used, to an eRoT. When the management controller and the chassis are provisioned according to one or more embodiments of the invention, security checks may be performed by management controller executing an initial program loader (IPL) using the aforementioned bindings. If the bindings are not present or do not match, then the boot process halts and the user is unable to use the information handling system.

19 Claims, 6 Drawing Sheets

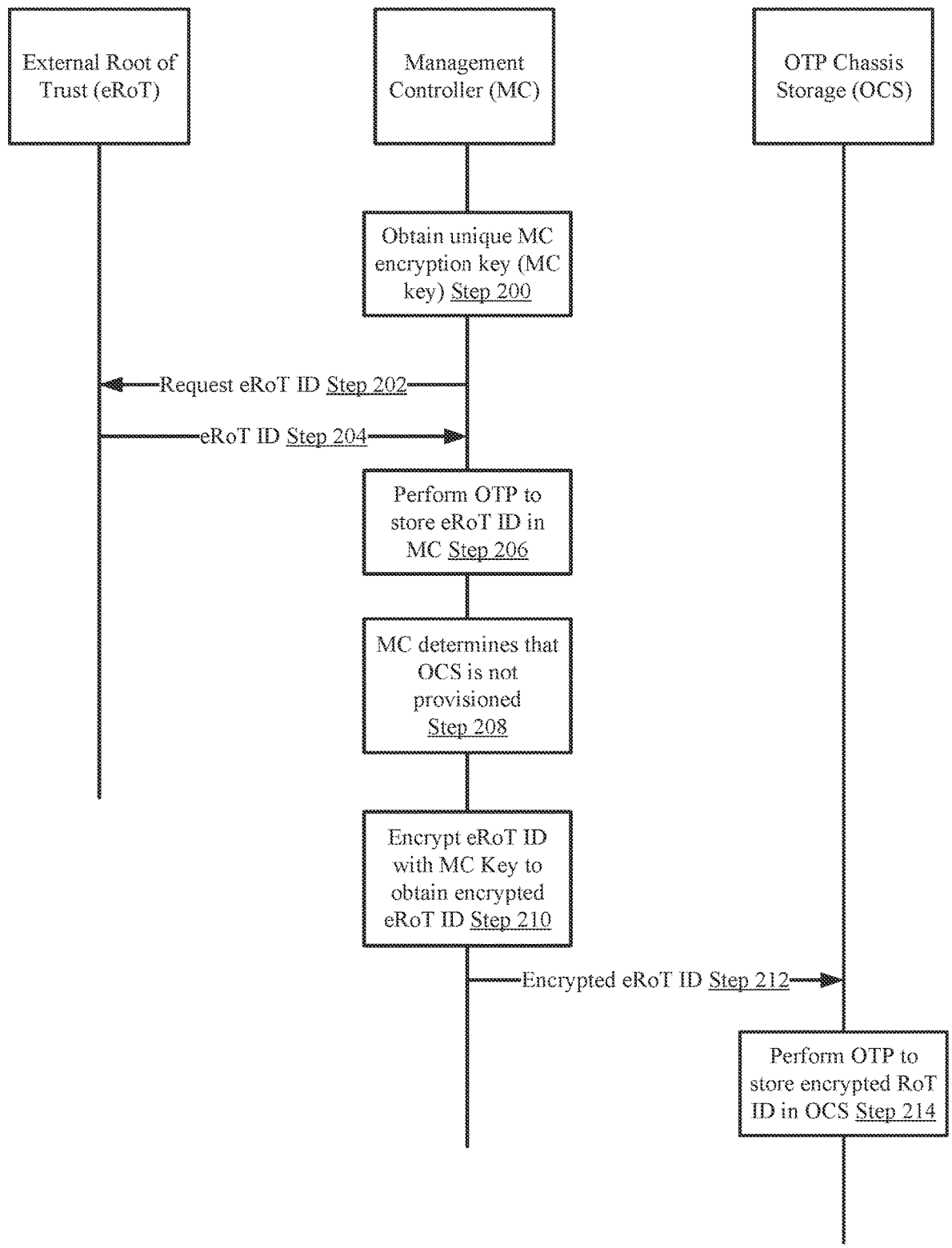
FIG. 2.1

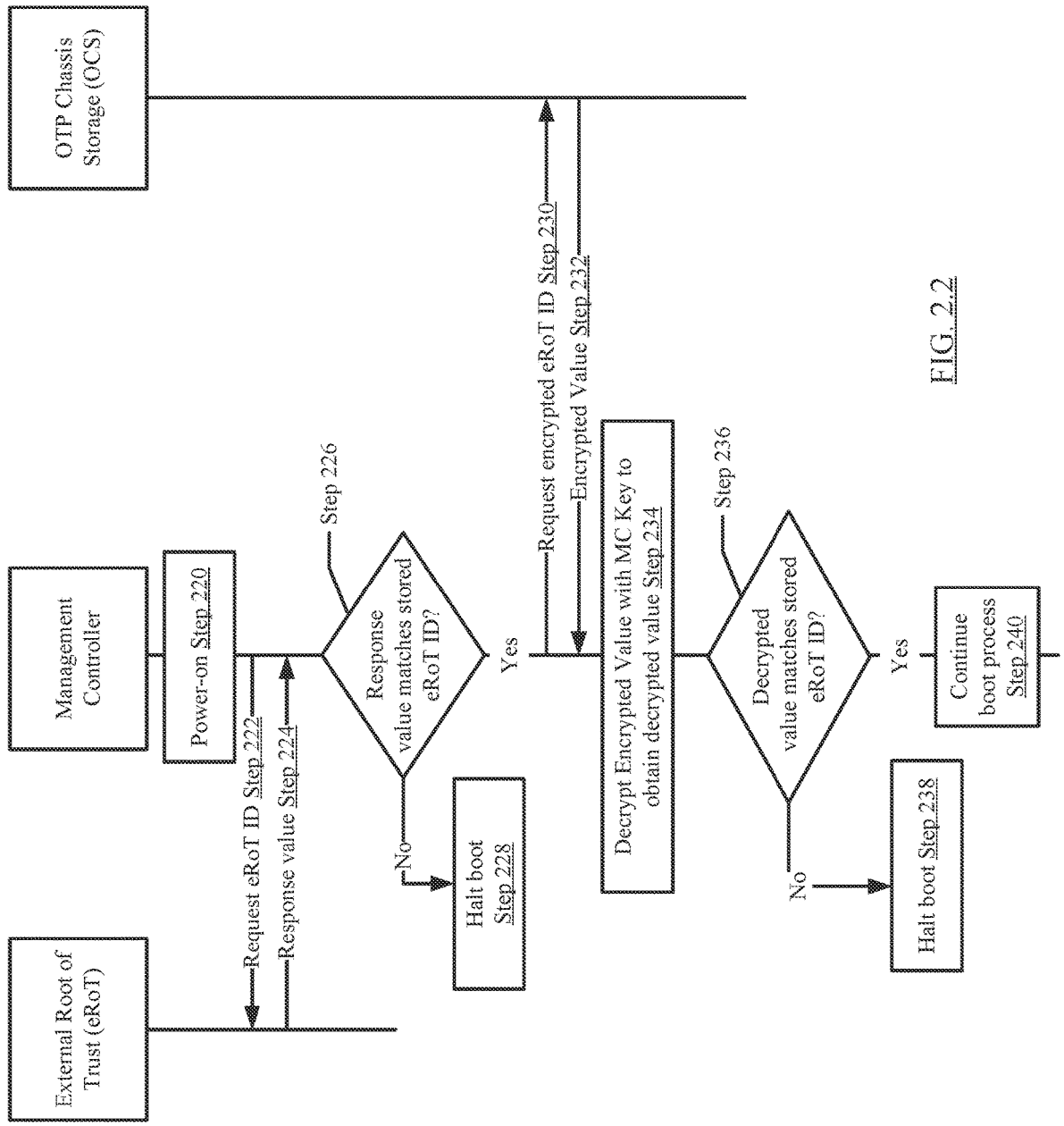
FIG. 2.2

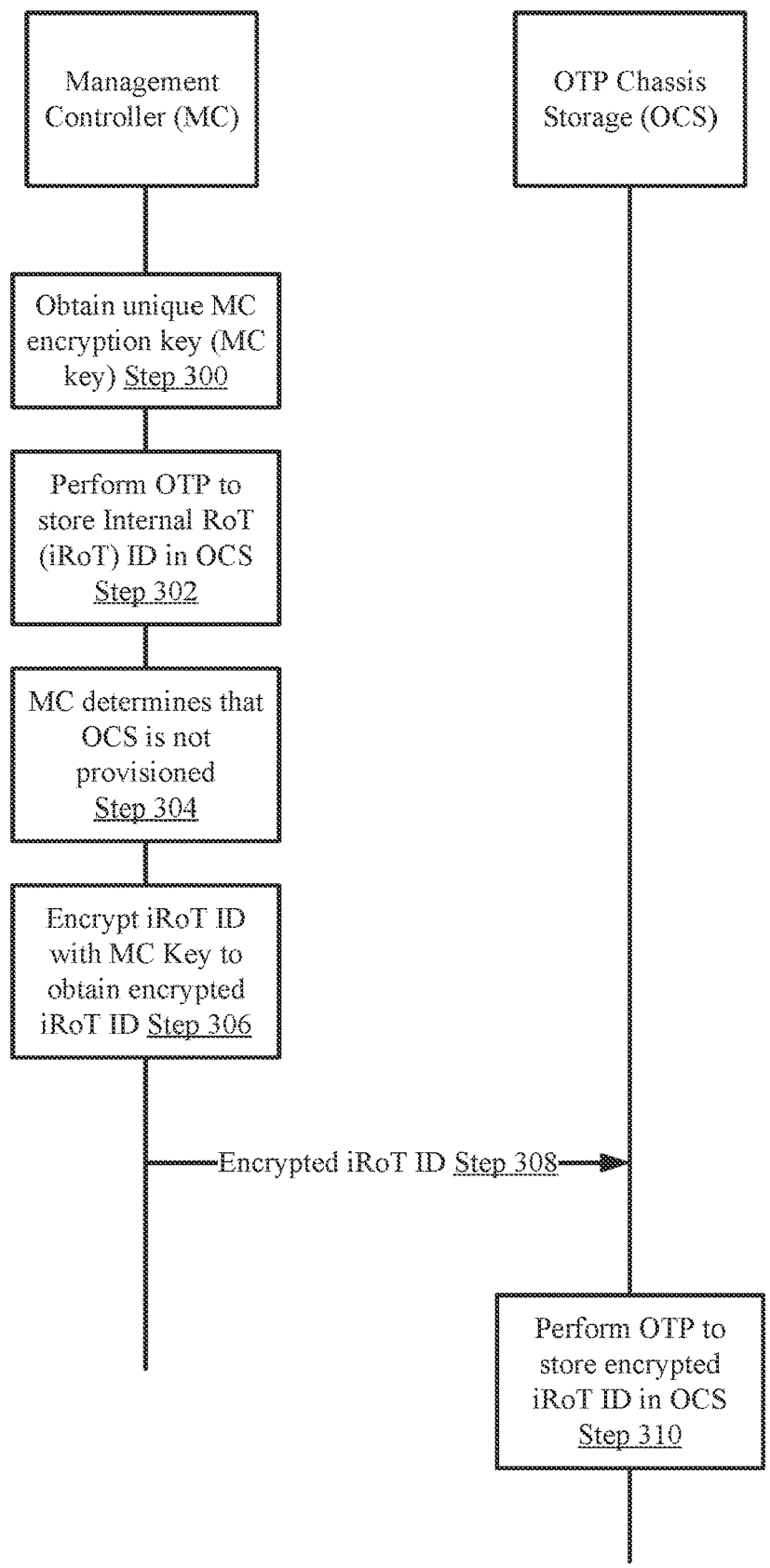
FIG. 3.1

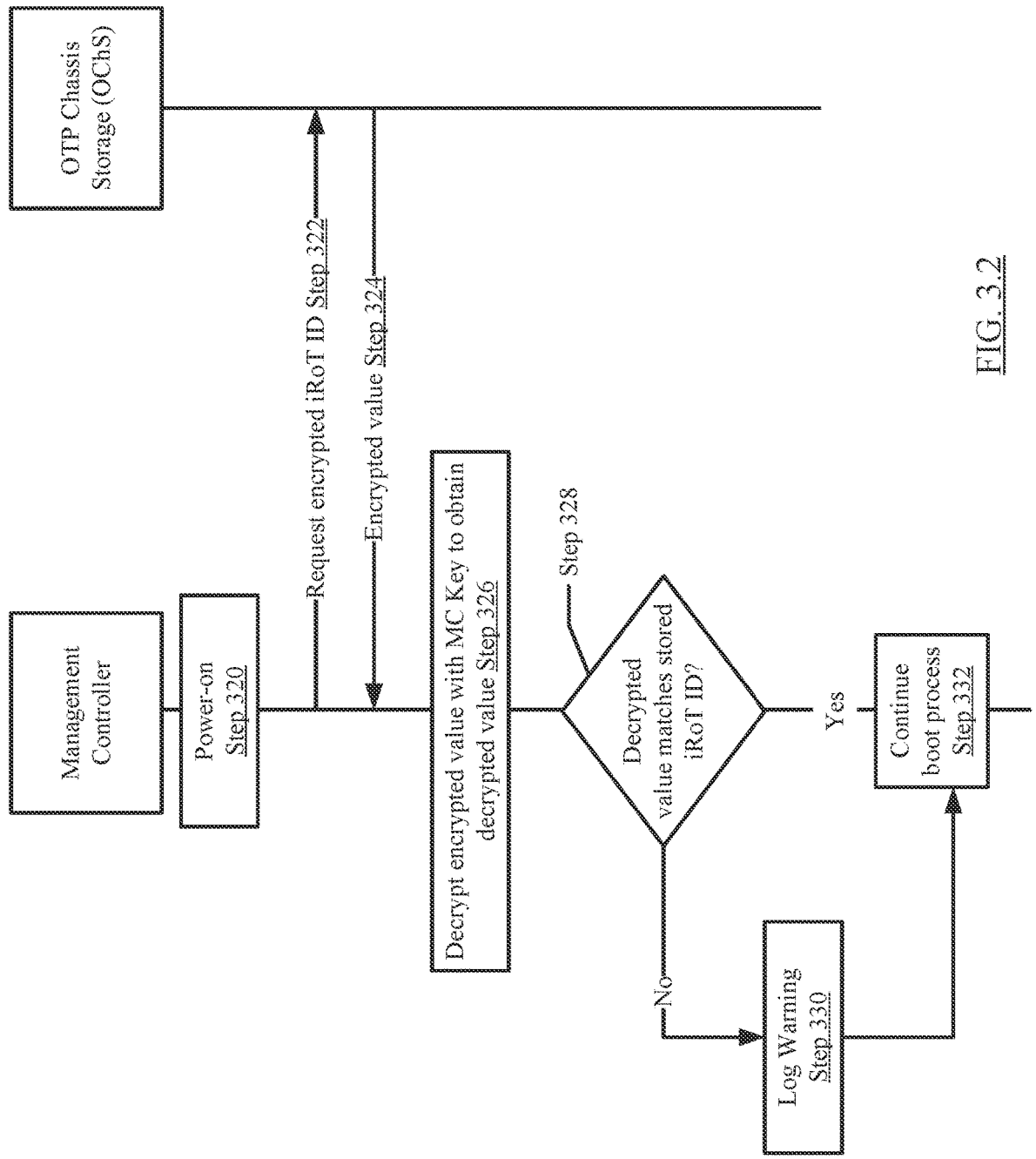
FIG. 3.2

METHOD TO SECURELY TRANSFER ROOT OF TRUST RESPONSIBILITIES ON A COMMON SHARED MOTHERBOARD

BACKGROUND

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to the changing uses of information handling systems, the components that makeup the information handling systems have become modular. While this allows information handling systems to be customized to support a larger number of use cases, the manufacturers of components for information handling systems have found it challenging to ensure that their components are utilized in the manner in which they were intended to be used.

BRIEF DESCRIPTION OF DRAWINGS

FIG. 2.1 shows the provisioning process using an External Root of Trust (eRoT) in accordance with one or more embodiments of the invention.

FIG. 2.2 shows the bootup process using an eRoT in accordance with one or more embodiments of the invention.

FIG. 3.1 shows the provisioning process using an Internal Root of Trust (iRoT) mechanism in accordance with one or more embodiments of the invention.

FIG. 3.2 shows the bootup process using an iRoT mechanism in accordance with one or more embodiments of the invention.

DETAILED DESCRIPTION

Figure 1:
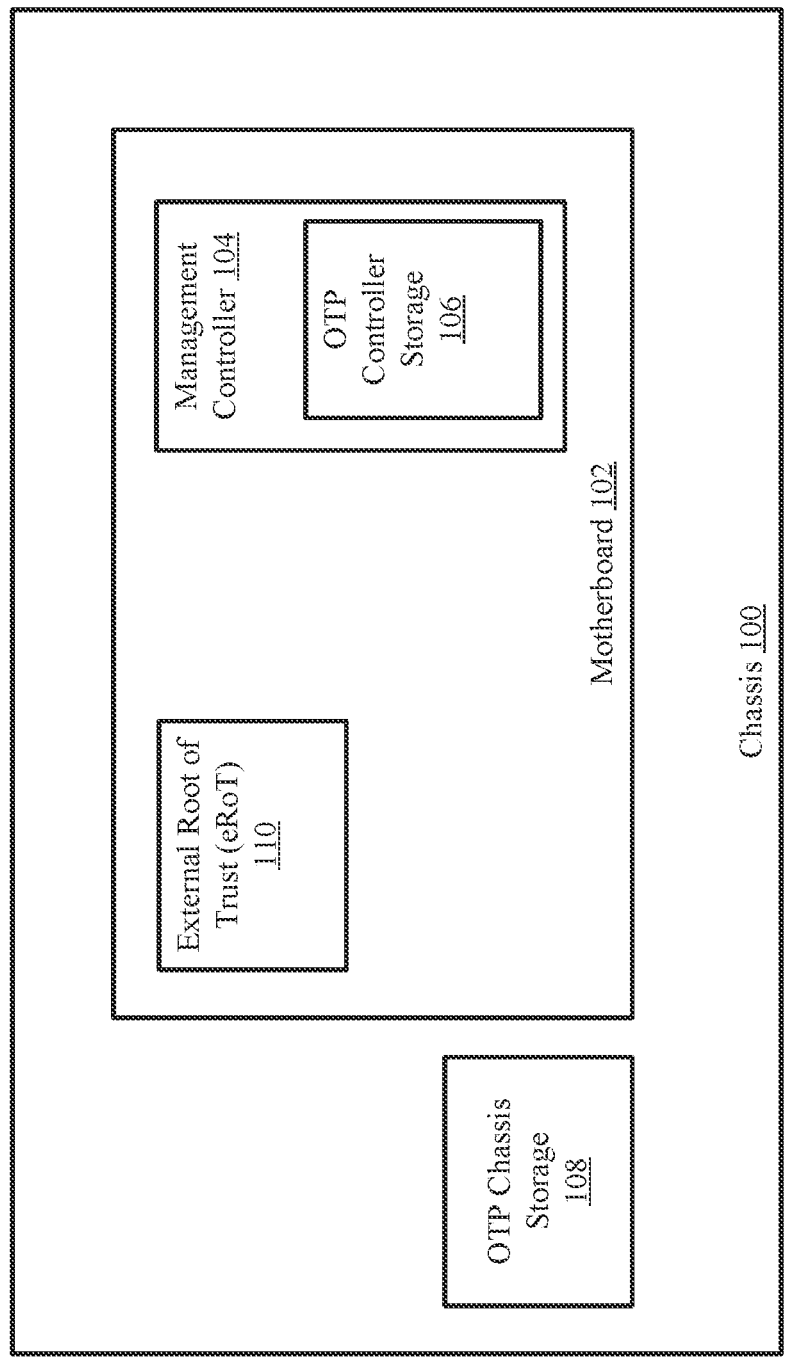
FIG. 1 shows a chassis in accordance with one or more embodiments of the invention.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details known to those of ordinary skill in the art may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired or wireless connection directly between two devices) or indirect (e.g., wired and/or wireless connections between any number of devices connecting the operatively connected devices) connection.

In general, embodiments of the invention relate to implementing a secure boot process in information handling systems that supports both an external root of trust (eRoT) and an internal root of trust (RoT). More specifically, embodiments of the invention relate to binding a management controller (also referred to as baseboard management controller (BMC)) to a specific chassis and, in the case where the eRoT is used, to an eRoT. When the management controller and the chassis are provisioned according to one or more embodiments of the invention, security checks may be performed by management controller executing an initial program loader (IPL) using the aforementioned bindings. If the bindings are not present or do not match, then the boot process halts and the user is unable to use the information handling system. In this manner, only information handling systems that are properly provisioned may be booted up, thereby preserving, e.g., the manufacturer's supply-chain security (e.g., hacker's are prevented from inserting a different motherboard into a provisioned chassis).

The following describes various embodiments of the invention.

In one embodiment of the invention, an information handling system may include a frame and any number of chassis. The frame may be a mechanical structure that enables chassis to be positioned with respect to one another. For example, the frame may be a rack mount enclosure that enables chassis to be disposed within it. The frame may be implemented as other types of structures adapted to house, position, orient, and/or otherwise physically, mechanically, electrically, and/or thermally manage chassis. By managing the chassis, the frame may enable multiple chassis to be co-located.

FIG. 1 shows a chassis in accordance with one or more embodiments of the invention. A chassis (e.g., 100) may be a mechanical structure for housing components of an information handling system. For example, a chassis may be implemented as a rack mountable enclosure for housing computing components of an information handling system. The chassis may be adapted to be disposed within a frame (not shown).

The chassis (100) may include various computing components. The computing components may include, for example, processors, memory modules, storage devices, special purpose hardware, communication components, interface components, communication components, and/or other types of physical components that contribute to the operation of a computing device. For additional details regarding computing devices, refer to FIG. 4.

Continuing with the discussion of FIG. 1, with respect to computing components that a chassis may include, FIG. 1 show a chassis (100) that includes a motherboard (102) and one-time-programmable (OTP) chassis storage (108). Further, the motherboard (102) may include an eRoT (110) and a management controller (104). Finally, the management controller (104) may include an OTP controller storage (106). Each of these components is described below. Those skilled in the art will appreciate that other computing components may be present on the motherboard and/or chassis without departing from the invention.

In one embodiment of the invention, the motherboard (102) is a printed circuit board (PCB) that includes functionality to enable computing components to be mounted thereon and/or connected thereto (e.g., the eRoT (110), the management controller (104), etc.). In addition, the motherboard (102) includes electrical interfaces and connections to enable communication between computing components mounted on (or connected to) the motherboard (e.g., the management controller 104) as well as communication with components external to the motherboard but that are located within the chassis (e.g., OTP chassis storage (108)).

In one embodiment of the invention, the management controller (104) is a specialized processor mounted on the motherboard (104). In one embodiment of the invention, the management controller includes multiple interfaces that allows it to monitor the hardware and firmware in the IHS. For example, the management controller may include functionality to monitor the BIOS firmware, the UEFI firmware, as well as determine when the various computing components on the motherboard are powered up. In addition, the motherboard includes functionality to perform all or a portion of the functions as described in FIGS. 2.1-3.2. In one embodiment of the invention, the management controller may also be referred to as a baseboard management controller. The management controller may be accessed by an administrator of the IHS via a dedicated (i.e., out-of-band) or shared (i.e., in-band) network connection.

In one embodiment of the invention, the management controller (104) includes OTP controller storage (106) and functionality to perform the steps and/or actions required to perform the one-time-programming of the OTP controller storage (106). In one embodiment of the invention, OTP controller storage (106) is a non-volatile storage media that is designed to enable data to be written to it one time. Once the data is written to the OPT controller storage (106), the OTP controller storage (106) operates as read-only media. Said another way, after data is written to the OTP controller storage (106), the data is permanently stored and/or fused into the OTP controller storage (106) and, as such, cannot be changed.

In one embodiment of the invention, an (110) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256).

As shown in FIG. 1, eRoT (110) may be mounted on the motherboard (102) in a location that is external to the management controller (102). In another embodiment of the invention, the eRoT (110) may embedded on the management controller (104). In another embodiment of the invention, see e.g., FIGS. 3.1-3.2, the motherboard does not include the eRoT (110); rather, an internal root of trust mechanism, which is external to the IHS is used. Additional details about this mechanism are provided below with respect to FIGS. 3.1-3.2

In one embodiment of the invention, OTP chassis storage (108) is a non-volatile storage media that is design to enable data to be written to it one time. Once the data is written to the OTP chassis storage (108), the OTP chassis storage (108) operates as read-only media. Said another way, after data is written to the OTP chassis storage (108), the data is permanently stored and/or fused into OTP chassis storage (108) and, as such, cannot be changed OTP chassis storage (108). Data may be written to the OTP chassis storage (108) using a serial peripheral interface (SPI). In such embodiments, the management controller (102) includes functionality to communicate with the OTP chassis storage (108) via the SPI. Other interfaces and/or protocols may be used to facilitate communication between the management controller and the OTP chassis storage without departing from the invention. Further details about the communication between the OTP chassis storage (108) and the management controller (102) are described below in FIGS. 2.1-3.2.

Those skilled in the art will appreciated that while FIG. 1 shows an embodiment of the invention, the invention is not limited to the architecture shown in FIG. 1.

The following describes the interaction between the various computing components in the chassis in accordance with one or more embodiments of the invention. More specifically, FIGS. 2.1 and 3.1 detail various embodiments for provisioning an IHS while FIGS. 2.2. and 3.2 detail various embodiments for using a provisioned IHS.

Turning to FIGS. 2.1 and 2.2, consider a scenario in which an ultimate user of the IHS wants to add an additional layer of security by using its own root of trust, i.e., an eRoT. In this scenario, the manufacturer may include a limited amount of firmware on the management controller, i.e., the initial program loader (IPL), which includes functionality to perform The method shown in FIG. 2.2. The remainder of the firmware related to the boot loader (e.g., firmware that includes functionality to load the user's kernel from persistent storage into the memory of the IHS) is provided by the user and is signed (or otherwise secured) using the eRoT. Further, while the IPL is provided by the manufacturer, it is also signed (or otherwise secured) using the eRoT. Finally, all of the other software (e.g., the user's kernel, and other user applications (if any)) are also signed or otherwise secured) by the eRoT.

As discussed above, the eRoT is used to sign (or otherwise secure) the firmware and software on the IHS. This allows the user to ensure that firmware and software running on the IHS is the firmware and software that the user intended to load and execute on the IHS. To ensure that the user has confidence that the eRoT can be used as a root of trust in a given IHS, embodiments of the invention bind the eRoT, management controller, and the OTP chassis storage together in a manner that allows the management controller to verify that the eRoT is the eRoT that was previously bound to the management controller and the OTP chassis storage. Once this verification is complete, the user may then have confidence that the eRoT can be used as the root of trust to verify the signed firmware and software in the IHS. FIG. 2.1 shows the provisioning process using an External Root of Trust (eRoT) in accordance with one or more embodiments of the invention. The result of the provisioning in FIG. 2.1 is the binding (or fusing) of the various hardware components together in a manner that ensures that they can only be used together. Said another way, if a user attempts to modify the hardware configuration after the provisioning in FIG. 2.1, the IHS may be prevented from booting. See e.g., FIG. 2.2.

Turning to FIG. 2.1, in step 200, a unique per management controller encryption key (MC key) is obtained. The MC key may be provided by the manufacturer or any other trusted third-party. The MC key may be of any length (e.g., any number of bits) and generated using any known or later discovered method for generating encryption keys. The MC key may be implemented as a symmetric key. The MC performs a one-time-programming (OTP) operation to store the MC key in the OPT controller storage (i.e., FIG. 1, 106).

In step 202, the MC, after determining that it needs to be fused with (or bound to) an eRoT, sends a request to the eRoT for an eRoT identifier (ID).

In step 204, in response to the request, the eRoT sends its eRoT ID to the MC. The eRoT ID is an identifier that is unique to the eRoT.

In step 206, the MC then performs an OTP operation to store the eRoT ID in the OTP controller storage (i.e., FIG. 1, 106). At this stage the eRoT is fused to (or otherwise bound) to the MC.

In step 208, the MC determines that the OTP chassis storage (OCS) is not provisioned.

In step 210, in response to the determination in in Step 208, the MC encrypts, using an encryption algorithm, the eRoT ID with the MC key to obtain an encrypted eRoT. In one or more embodiments of the invention, the encryption algorithm includes functionality to transform eRoT ID into an encrypted format that is unreadable by any entity that does not possess the MC key. For example, the encryption algorithm may correspond to Data Encryption Algorithm (DEA) specified in the Data Encryption Standard (DES), Triple DES, Advanced Encryption Standard (AES), any other encryption algorithm, or any combination thereof. The MC may only implement symmetric encryption algorithm(s).

In step 212, the MC sends the encrypted eRoT to the OCS.

In step 214, the OCS performs an OTP operation to store the encrypted eRoT in the OCS (i.e., FIG. 1, 108). At this stage the OCS is bound to the management controller and the eRoT. The user may then take additional steps to sign the IPL, the boot loader, and/or any other firmware or software using the eRoT.

FIG. 2.2 shows the bootup process using an External Root of Trust (eRoT) in accordance with one or more embodiments of the invention. As discussed above, this process occurs when the IHS is booted-up/powered on after it has been configured (e.g., after the process shown in FIG. 2.1 has been completed). The method shown in FIG. 2.2 is orchestrated by the MC and, more specifically, by the execution of the IPL by the MC.

In step 220, the MC detects that the IHS (i.e., the IHS in which the MC is located) is powered on. This detection triggers the execution of the IPL by the MC to perform the following steps.

In step 222, the MC sends a request for an eRoT ID to the eRoT (i.e., the eRoT on the motherboard and/or embedded on the MC).

In step 224, in response to the request, the eRoT provides a response value to the MC, which it represents is the eRoT ID. However, this assertion needs to be verified by the MC.

In step 226, the MC obtains the stored eRoT ID (i.e., the eRoT ID that was stored in the OTP controller storage during provisioning) and determines whether the response value matches the stored eRoT ID. If the response value matches the stored eRoT ID, then the process proceeds to step 230; otherwise, the process proceeds to step 228.

In step 228, the IPL halts the boot process and may (or may not) issue an error message to the user of the IHS.

In step 230, the MC continues the verification process by sending a request for an encrypted eRoT ID to the OCS.

In step 232, in response to the request, the OCS provides an encrypted value to the MC, which it represents is the encrypted eRoT ID. However, this assertion needs to be verified by the MC.

In step 234, the MC obtains the MC key, decrypts the encrypted value received in Step 232 to obtain a decrypted value.

In step 236, the MC obtains the stored eRoT ID (i.e., the eRoT ID that was stored in the OTP controller storage during provisioning) and determines whether the decrypted value matches the stored eRoT ID. If the response value matches the stored eRoT ID, then the process proceeds to step 240; otherwise, the process proceeds to step 238.

In step 238, the IPL halts the boot process and may (or may not) issue an error message to the user of the IHS.

In step 240, the MC has successful verified that eRoT, the MC, and the OCS in the IHS were same components that were fused during the provisioning process. At this stage, the MC may then continue the boot process, e.g., by using the eRoT to verify that the firmware and software on the IHS is properly signed by the eRoT and, if so, permitting executing of the firmware (e.g., the boot loader) and/or software.

Turning to FIGS. 3.1 and 3.2, consider a scenario in which an ultimate user of the IHS wants to use the manufacturer's root of trust, i.e., an internal RoT (iRoT). In this scenario, the manufacturer maintains its own root of trust (i.e., an iRoT) and the IPL, firmware, and software is signed (or otherwise secured) using the encryption keys provided by the iRoT. Further, because the iRoT is maintained by the manufacturer, the MC does not need to first verify the iRoT during bootup in the same manner as it verifies the eRoT; rather, the MC only needs to verify that the MC is properly fused to the chassis. FIG. 3.1 shows the provisioning process using an iRoT mechanism in accordance with one or more embodiments of the invention. The result of the provisioning in FIG. 3.1 is the binding (or fusing) of the various hardware components together in a manner that ensures that they can only be used together. Said another way, if a user attempts to modify the hardware configuration after the provisioning in FIG. 3.1, the IHS may be prevented from booting. See e.g., FIG. 3.2.

FIG. 3.1 shows the provisioning process using an Internal Root of Trust (iRoT) mechanism in accordance with one or more embodiments of the invention.

In step 300, in step 300, a unique per management controller encryption key (MC key) is obtained. The MC key may be provided by the manufacturer or any other trusted third-party. The MC key may be of any length (e.g., any number of bits) and generated using any known or later discovered method for generating encryption keys. The MC key may be implemented as a symmetric key. The MC performs a one-time-programming (OTP) operation to store the MC key in the OPT controller storage (i.e., FIG. 1, 106).

In step 302, the MC obtains the iRoT ID from the manufacturer during the provisioning process. The iRoT ID is an identifier that is unique to the iRoT. The MC performs an OTP operation to store the iRoT ID in the OTP controller storage (i.e., FIG. 1, 106).

In step 304, the MC determines that the OTP chassis storage (OCS) is not provisioned.

In step 306, in response to the determination in Step 304, the MC encrypts, using an encryption algorithm, the iRoT ID with the MC key to obtain an encrypted iRoT. In one or more embodiments of the invention, the encryption algorithm includes functionality to transform iRoT ID into an encrypted format that is unreadable by any entity that does not possess the MC key. For example, the encryption algorithm may correspond to Data Encryption Algorithm (DEA) specified in the Data Encryption Standard (DES), Triple DES, Advanced Encryption Standard (AES), any other encryption algorithm, or any combination thereof. The MC may only implement symmetric encryption algorithm(s).

In step 308, the MC sends the encrypted iRoT to the OCS.

In step 310, the OCS performs an OTP operation to store the encrypted iRoT in the OCS (i.e., FIG. 1, 108). At this stage the OCS is bound to the management controller and the eRoT. The manufacturer may take additional steps to sign the IPL, the boot loader, and/or any other firmware or software using the iRoT.

FIG. 3.2 shows the bootup process using an Internal Root of Trust (iRoT) mechanism in accordance with one or more embodiments of the invention. As discussed above, this process occurs when the IHS is booted-up/powered on after it has been configured (e.g., after the process shown in FIG. 3.1 has been completed). The method shown in FIG. 3.2 is orchestrated by the MC and, more specifically, by execution of the IPL in the MC.

In Step 320, the MC detects that the IHS (i.e., the IHS in which the MC is located) is powered on. This detection triggers the execution of the IPL by the MC to perform the following steps.

In Step 322, the MC sending a request for an encrypted iRoT ID from the OCS.

In Step 324, in response to the request, the OCS provides an encrypted value to the MC, which it represents is the encrypted iRoT ID. However, this assertion needs to be verified by the MC.

In Step 326, the MC obtains the MC key, decrypts the encrypted value received in Step 324 to obtain a decrypted value.

In Step 328, the MC obtains the stored iRoT ID (i.e., the iRoT ID that was stored in the OTP controller storage during provisioning) and determines whether the decrypted value matches the stored iRoT ID. If the response value matches the stored iRoT ID, then the process proceeds to step 332; otherwise, the process proceeds to step 330.

In Step 330, the IPL logs a warning. Once the warning is logged, the process continues to step 332. In one embodiment of the invention, the decrypted value may not match the stored iRoT ID when there is a faulty motherboard. In such cases, the IPL allows the booting to continue but does log this issue so that is may be addressed by an administrator, etc.

In Step 332, the MC has successful verified that the MC, and the OCS in the IHS were same components that were fused during the provisioning process. At this stage, the MC may then continue the boot process, e.g., by using the iRoT keys stored in the MC to verify that the firmware and software on the IHS is properly signed by the iRoT and, if so, permitting executing of the firmware (e.g., the boot loader) and/or software.

Figure 4:
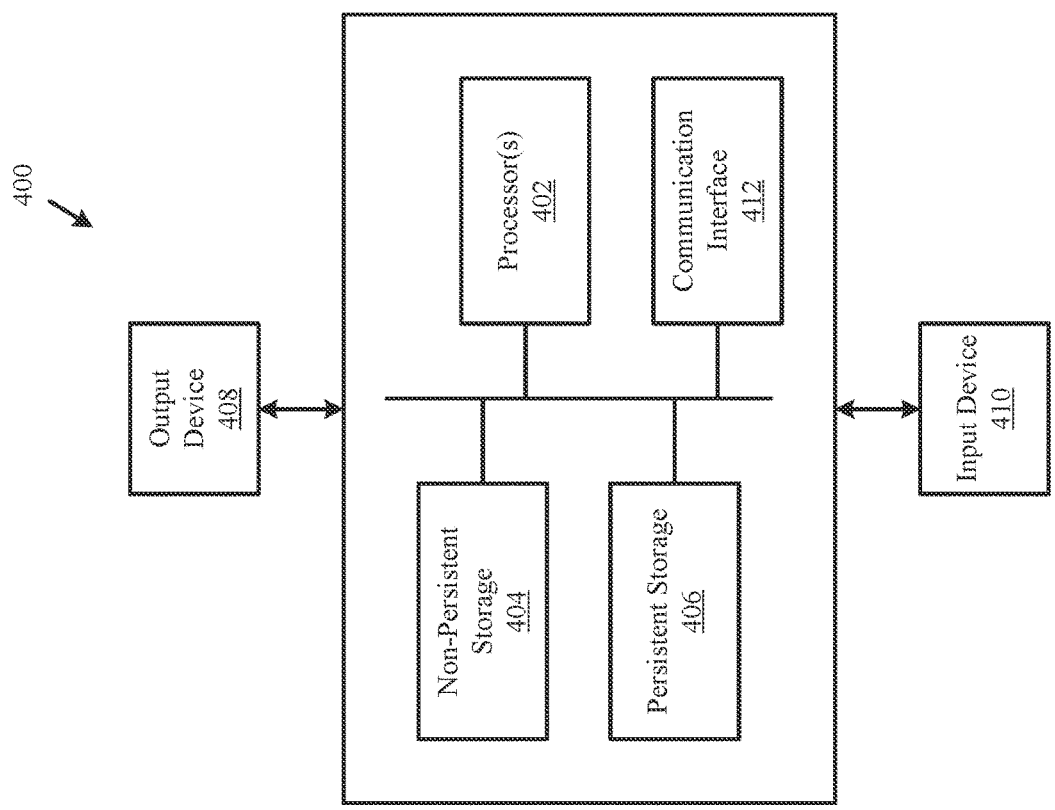
FIG. 4 shows a diagram of a computing device in accordance with one or more embodiments of the invention.

FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

While one or more embodiments have been described herein with respect to a limited number of embodiments and examples, those skilled in the art, having benefit of this disclosure, would appreciate that other embodiments can be devised which do not depart from the scope of the embodiments disclosed herein. Accordingly, the scope should be limited only by the attached claims.

What is claimed is:
1. An information handling system, comprising:
 a chassis comprising chassis storage; and a motherboard located within the chassis comprising a management controller, wherein the management controller comprises controller storage,
wherein the controller storage comprises a unique encryption key and a root of trust (RoT) identifier,
wherein the chassis storage comprises an encrypted value generated by encrypting the RoT identifier with the unique encryption key,
wherein the management controller is programmed to:
after being powered on and prior to initiating a boot loader:
requesting the encrypted value from the chassis storage;
receiving the encrypted value from the chassis storage;
decrypting the encrypted value for the chassis storage using the unique encryption key to obtain a decrypted value; and
initiating the boot loader when the decrypted value equals the RoT identifier.

2. The information handling system of claim 1, further comprising:
a RoT that generated the RoT identifier,
wherein the RoT is operatively connected to the management controller, and
wherein the RoT identifier is unique to the RoT.

3. The information handling system of claim 2, wherein the RoT is located on the management controller.

4. The information handling system of claim 2, wherein the RoT is located on the motherboard and external to the management controller.

5. The information handling system of claim 2, wherein the management controller is programmed to:
after being powered on and prior to initiating the boot loader:
requesting the RoT identifier from the RoT;
receiving, in response to the request, a response value from the RoT; and
determining whether the RoT identifier stored in the controller storage matches the response value.

6. The information handling system of claim 5, wherein the management controller is further programmed to:
stop further bootup of the information handling system when the RoT identifier stored in the controller storage does not match the response value.

7. The information handling system of claim 5, wherein the management controller is further programmed to:
when the RoT identifier stored in the controller storage matches the response value:
requesting the encrypted value from the chassis storage;
receiving the encrypted value from the chassis storage;
decrypting the encrypted value for the chassis storage using the unique encryption key to obtain a second decrypted value; and
initiating execution of the boot loader when the second decrypted value equals the RoT identifier.

8. The information handling system of claim 1, wherein the chassis storage is one-time programmable storage and is not located on the motherboard.

9. The information handling system of claim 8 wherein the controller storage is one-time programmable storage and is located on the motherboard.

10. The information handling system of claim 1, wherein the unique encryption key is unique to the management controller.

11. The information handling system of claim 1, wherein the management controller is a baseboard management controller.

12. A method for securely booting an information handling system comprising a chassis and a management controller, the method comprising:
after being powered on and prior to initiating a boot loader:
requesting, by the management controller, a root of trust (RoT) identifier from a RoT;
receiving, in response to the request, a response value from the RoT;
determining, by the management controller, that the RoT identifier stored in a controller storage matches the response value;
based on the determination:
requesting an encrypted value from a chassis storage located in the chassis;
receiving the encrypted value from the chassis storage;
decrypting the encrypted value for the chassis storage using a unique encryption key to obtain a decrypted value; and
initiating the boot loader when the decrypted value equals the RoT identifier.

13. The method of claim 12, further comprising:
prior to requesting, by the management controller, the RoT identifier from the RoT, provisioning the information handling system, wherein the provisioning comprises:
requesting, by the management controller, the RoT identifier from the RoT;
receiving, in response to the request, the RoT identifier from the RoT;
fusing the RoT identifier to the management controller;
encrypting the RoT identifier using the unique encryption key to obtain the encrypted value; and
initiating the fusing of the encrypted value to the chassis storage.

14. The method of claim 13,
wherein the controller storage is a first one-time programmable storage and is located on a motherboard in the chassis; and
wherein the chassis storage is a second one-time programmable storage and is not located on the motherboard.

15. The method of claim 13, wherein the unique encryption key is unique to the management controller.

16. The method of claim 13, wherein the management controller is a baseboard management controller.

17. The method of claim 13, wherein the RoT is located on the management controller.

18. The method of claim 13, wherein the RoT is located on a motherboard in the chassis and external to the management controller.

19. The method of claim 13, wherein the RoT identifier that is stored in the controller storage cannot be changed after the fusing.

* * * * *